US012782710B2

(12) United States Patent
Nakano

(10) Patent No.: US 12,782,710 B2
(45) Date of Patent: Nov. 3, 2026

(54) OPTICAL APPARATUS, ON-BOARD SYSTEM, AND MOVABLE APPARATUS

(71) Applicant: CANON KABUSHIKI KAISHA, Tokyo (JP)

(72) Inventor: Masatsugu Nakano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/588,066

(22) Filed: Feb. 27, 2024

(65) Prior Publication Data

US 2024/0329388 A1 Oct. 3, 2024

(30) Foreign Application Priority Data

Mar. 31, 2023 (JP) ................................ 2023-059445

(51) Int. Cl.

| | |
|---|---|
| ***G02B 26/08*** | (2006.01) |
| ***B60Q 5/00*** | (2006.01) |
| ***B60Q 9/00*** | (2006.01) |
| ***B60T 7/22*** | (2006.01) |
| ***B60T 8/171*** | (2006.01) |
| ***G02B 26/10*** | (2006.01) |
| ***G02B 26/12*** | (2006.01) |

(52) U.S. Cl.

CPC ......... *G02B 26/0816* (2013.01); *B60Q 5/006* (2013.01); *B60Q 9/008* (2013.01); *B60T 7/22* (2013.01); *B60T 8/171* (2013.01); *G02B 26/101* (2013.01); *G02B 26/12* (2013.01); *B60T 2201/022* (2013.01); *B60T 2210/32* (2013.01)

(58) Field of Classification Search

CPC .. G02B 26/0816; G02B 26/101; G02B 26/12; B60Q 5/006; B60Q 9/008; B60T 7/22; B60T 8/171; B60T 2201/022; B60T 2210/32

USPC .................................................. 701/70, 70 B

See application file for complete search history.

(56) References Cited

U.S. PATENT DOCUMENTS

| | | | | |
|---|---|---|---|---|
| 2021/0354669 | A1* | 11/2021 | Kawakami | B60Q 9/008 |
| 2022/0113535 | A1* | 4/2022 | Nakano | G01S 17/931 |
| 2022/0390565 | A1 | 12/2022 | Nakano | |
| 2024/0036171 | A1 | 2/2024 | Nakano | |
| 2024/0241225 | A1* | 7/2024 | Goren | G01S 17/42 |

FOREIGN PATENT DOCUMENTS

| | | |
|---|---|---|
| JP | 2009-098111 A | 5/2009 |

* cited by examiner

*Primary Examiner* — Scott A Reinbold

(74) *Attorney, Agent, or Firm* — Carter, DeLuca & Farrell LLP

(57) ABSTRACT

An optical apparatus includes a deflector configured to scan an object by deflecting illumination light from a light source unit and to deflect reflected light from the object, and a light receiver configured to receive the reflected light from the deflector. The deflector includes a first scanning element configured to scan the object in a first direction by deflecting the illumination light from the light source unit, and a second scanning element configured to scan the object in a second direction by deflecting the illumination light from the first scanning element. The light receiver includes a plurality of light-receiving elements arranged along a direction corresponding to the first direction.

1 Claim, 7 Drawing Sheets

OPTICAL APPARATUS, ON-BOARD SYSTEM, AND MOVABLE APPARATUS

BACKGROUND

Technical Field

One of the aspects of the embodiments relates to an optical apparatus that receives light reflected from an illuminated object and detects the object.

Description of Related Art

Light Detection and Ranging (LiDAR) is one known method for measuring a distance to an object by calculating the distance from the time it takes to receive reflected light from an illuminated object or a phase of the reflected light. Japanese Patent Laid-Open No. 2009-098111 discloses a configuration that includes a generator for generating a laser beam, a rotation deflector for rotating around a central axis, and a direction changer for deflecting a laser beam relative to a direction of the central axis. In the configuration disclosed in Japanese Patent Laid-Open No. 2009-098111, the laser beam scans the object by the direction changer and the rotation deflector, and the reflected light from the object passes through the rotation deflector and is guided to a photodetector without passing through the direction changer.

In the configuration disclosed in Japanese Patent Laid-Open No. 2009-098111, the reflected light from the object reaches different positions on the photodetector for each angle defined by the direction changer, so the light receiving size of the photodetector becomes large and unnecessary light other than reflected light is also received. Thereby, noise components increase, the distance measurement accuracy decreases, and this accuracy decrease becomes remarkable as the distance to the object increases.

SUMMARY

An optical apparatus according to one aspect of the disclosure includes a deflector configured to scan an object by deflecting illumination light from a light source unit and to deflect reflected light from the object, and a light receiver configured to receive the reflected light from the deflector. The deflector includes a first scanning element configured to scan the object in a first direction by deflecting the illumination light from the light source unit, and a second scanning element configured to scan the object in a second direction by deflecting the illumination light from the first scanning element. The light receiver includes a plurality of light-receiving elements arranged along a direction corresponding to the first direction. An on-board system and a moving apparatus each having the above optical apparatus also constitutes another aspect of the disclosure.

Further features of the disclosure will become apparent from the following description of embodiments with reference to the attached drawings.

DESCRIPTION OF THE EMBODIMENTS

Figure 1:
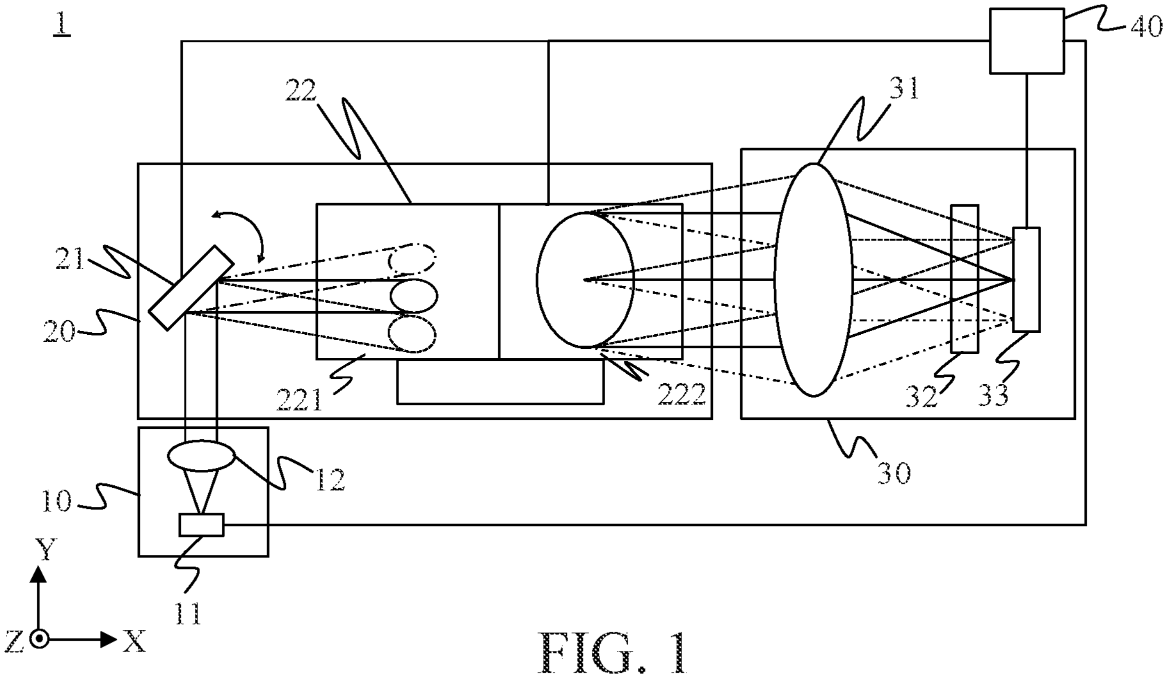
FIG. 1 is a schematic diagram of principal components in an optical apparatus according to Example 1.

Referring now to the accompanying drawings, a detailed description will be given of embodiments according to the disclosure. Corresponding elements in respective figures will be designated by the same reference numerals, and a duplicate description thereof will be omitted.

An optical apparatus using LiDAR includes an illumination system configured to illuminate an object (target) and a light receiving system configured to receive reflected light and scattered light from the object. LiDAR includes a coaxial system in which the optical axes of the illumination system and the light receiving system partially coincide with each other, and a non-coaxial system in which the optical axes of the illumination system and the light receiving system do not coincide with each other. In each example, a non-coaxial LiDAR is used as the optical apparatus, but a coaxial LiDAR may also be used.

The optical apparatus according to each example is used, for example, as an automatic driving support system in a vehicle such as an automobile. The object is, for example, a pedestrian, an obstacle, a vehicle, etc., and approximately 1 to 300 meters away. The optical apparatus according to each example measures the distance to the object, and controls the direction and speed of the vehicle based on the measurement result.

Example 1

FIG. 1 is a schematic diagram of principal components in an optical apparatus 1 according to this example viewed from the front. The optical apparatus 1 includes a light source unit 10, a deflector 20, a light receiver 30, and a control unit 40.

The coordinate system in this example is determined as illustrated in FIG. 1. More specifically, a direction in which illumination light travels from the light source unit 10 will be referred to as a Y-axis direction, a direction orthogonal to the Y-axis direction, in which the illumination light travels from the deflector 20 to the light receiver 30 will be referred to as an X-axis direction, and a direction orthogonal to the X-axis direction and the Y-axis direction will be referred to the Z-axis direction.

Figure 2:
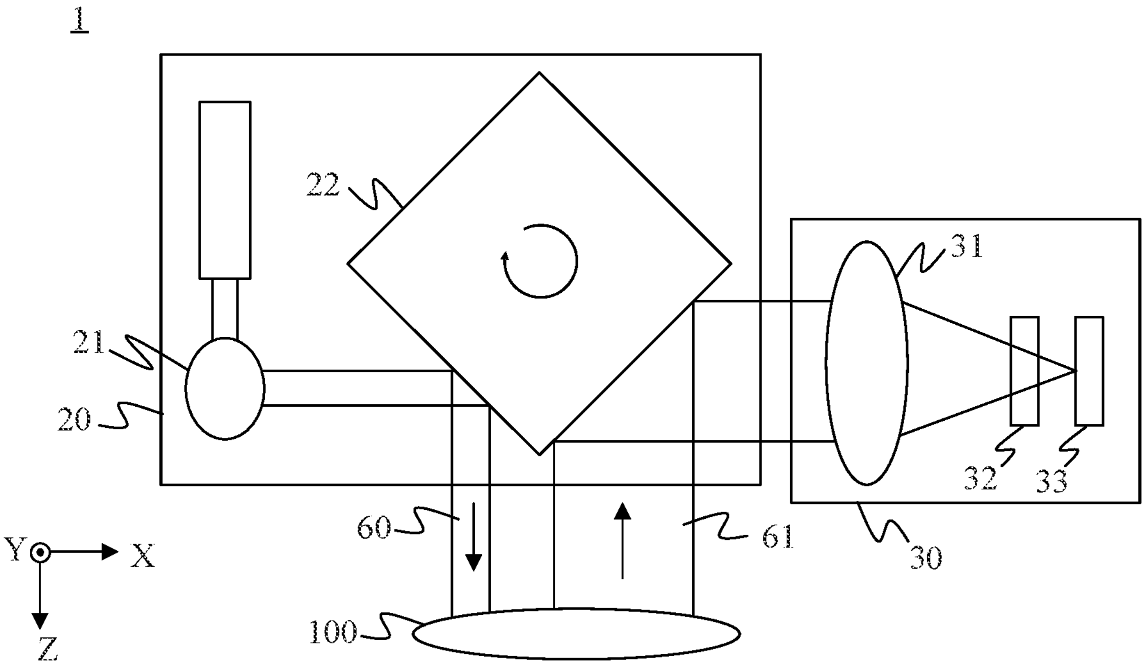
FIG. 2 is a top view of the optical apparatus according to Example 1.

FIG. 2 is a top view of the optical apparatus 1 (viewed from the +Y-axis direction). FIG. 2 illustrates an optical path (illumination optical path) for illumination light 60 from the light source unit 10 to the object (target) 100 and an optical path (light-receiving optical path) for reflected light 61 from the object 100 to the light receiver 30.

The optical apparatus 1 can be used as a detection apparatus (image pickup apparatus) that detects (images) the object 100 by receiving the reflected light 61 or as a distance measuring apparatus that obtains the distance (distance information) to the object 100. The optical apparatus 1 uses a technology called Light Detection and Ranging (LiDAR) that calculates the distance to the object 100 based on the time it takes to receive the reflected light 61 or the phase of the reflected light 61.

The light source unit 10 includes a light source 11 and a collimator lens 12. The light source 11 uses a semiconductor laser, which is a laser with high energy concentration and excellent directivity, a vertical cavity surface emitting laser or Vertical Cavity Surface Emitting Laser (VCSEL). In a case where the optical apparatus 1 is applied to an on-board system (in-vehicle system) as described below, the object 100 may be a person. Therefore, the light source 11 may use an infrared light emitter because infrared light has little influence on human eyes. In this example, the wavelength of the illumination light 60 emitted by the light source 11 is 905 nm, which is included in the near-infrared region.

Figure 3:
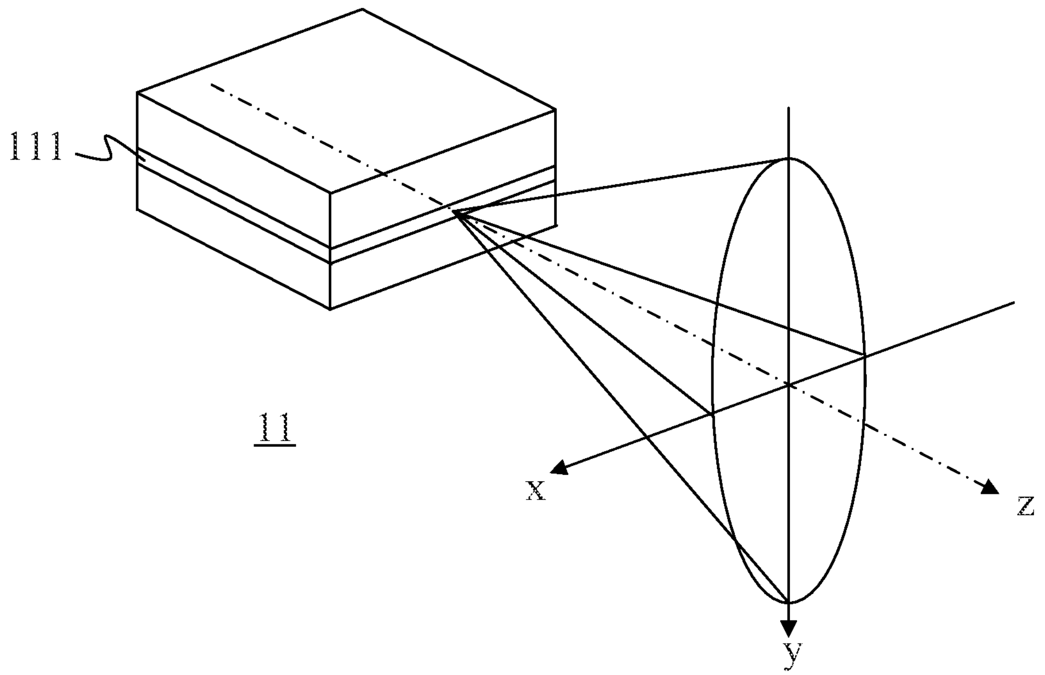
FIG. 3 is a schematic diagram illustrating a general semiconductor laser and an emitted light beam.

FIG. 3 is a schematic diagram illustrating a general semiconductor laser and an emitted light beam. As illustrated in FIG. 3, the light beam emitted from an active layer 111 of the semiconductor laser as the light source 11 is a diverging light beam, and the light beam in the xy section parallel to the emission surface (light emitting surface) of the active layer 111 has an elliptical shape. In semiconductor lasers, the polarization direction of the light beam (vibration direction of the electric field) is generally parallel to the top and bottom surfaces of the active layer 111 (direction within the zx section), and the divergent angle in this direction when the active layer 111 emits light is smaller than that in the direction within the zy section.

The illumination light (divergent light) 60 emitted from the light source 11 is collimated by the collimator lens 12 and becomes parallel light. The parallel light here includes not only strictly parallel light beam but also weakly diverging light and weakly converging light. After passing through the collimator lens 12, the illumination light 60 travels to the deflector 20.

The deflector 20 includes a first scanning element 21 and a second scanning element 22. The first scanning element 21 is rotatable about a rotation axis parallel to the Z-axis. The second scanning element 22 is rotatable about a rotation axis parallel to the Y-axis.

The first scanning element 21 scans the object 100 in the first direction (the Y-axis direction in this example) by deflecting the illumination light 60 from the light source unit 10 that travels in the +Y-axis direction. While a galvano mirror is used as the first scanning element 21 in this example, a Micro Electro Mechanical System (MEMS) mirror or the like may also be used.

The second scanning element 22 scans the object 100 in a second direction different from the first direction (Z-axis direction in this example) by deflecting the illumination light 60 that travels in the +X-axis direction from the first scanning element 21, and deflects the reflected light 61 and guides it to the light receiver 30. In this example, a polygon mirror having four reflective surfaces is used as the second scanning element 22, and one surface 221 of the polygon mirror reflects the illumination light 60 and irradiates it onto the object 100. The reflected light 61 enters a surface 222 of the polygon mirror that is different from the surface which the illumination light 60 enters, and deflects it to the light receiver 30.

The light receiver 30 includes a condenser lens (condenser optical system) 31, an optical filter 32, and a light-receiving element group 33.

The condenser lens 31 condenses the reflected light 61 from the second scanning element 22 onto the light-receiving surface of the light-receiving element included in the light-receiving element group 33. The optical filter 32 transmits only desired light and blocks (absorbs) other unnecessary light. In this example, the optical filter 32 is a bandpass filter that transmits only light in a wavelength band corresponding to the illumination light 60 emitted from the light source 11. The configurations of the condenser lens 31 and the optical filter 32 are not limited to the configurations of this example. For example, the order of arrangement of each member may be changed or a plurality of each member may be provided, as necessary.

The light-receiving element group 33 receives the light from the condenser lens 31, performs photoelectric conversion, and outputs a signal. The light-receiving element group 33 can use one including a Photo Diode (PD), an Avalanche Photo Diode (APD), a Singel Photo Avalanche Diode (SPAD), or the like.

Figure 4:
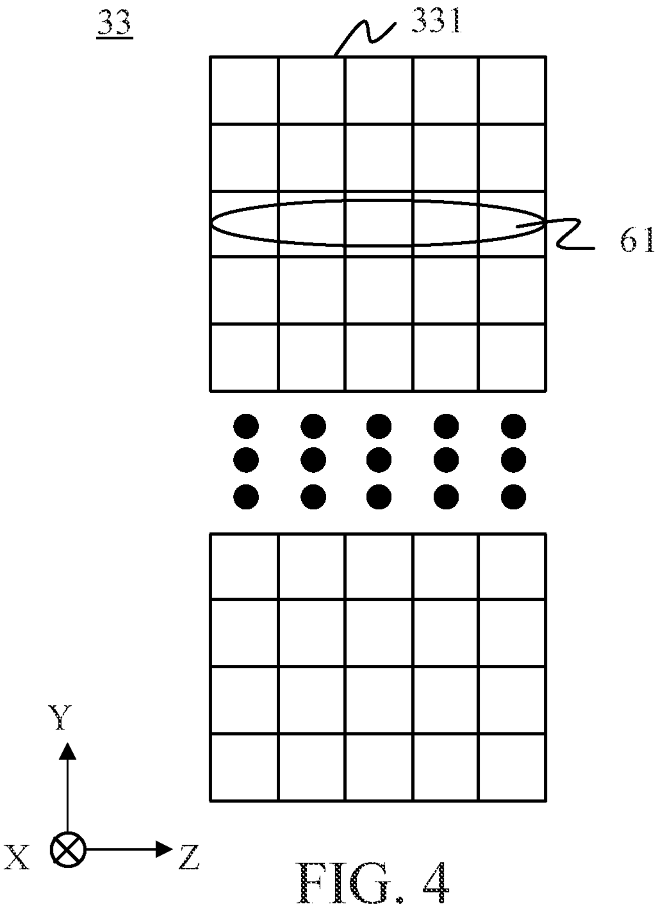
FIG. 4 is a schematic diagram of principal components in a light-receiving element group according to Example 1.

FIG. 4 is a schematic diagram of the principal components in the light-receiving element group 33, illustrating the configuration of the light-receiving element group 33 and the reflected light 61 that enters the light-receiving element group 33. The light-receiving element group 33 includes a plurality of light-receiving elements arranged along at least one direction. The plurality of light-receiving elements are arranged so as to receive the reflected light 61 in a direction corresponding to the direction in which the first scanning element 21 scans (first direction). The number of light-receiving elements 331 arranged in the direction corresponding to the second direction is smaller than that in the direction corresponding to the first direction. In this example, the light-receiving element group 33 includes a plurality of light-receiving elements 331 in the Y-axis direction and the Z-axis direction, and the number of light-receiving elements 331 arranged in the Z-axis direction is smaller than the number of light-receiving elements 331 arranged in the Y-axis direction.

The reflected light 61 from the object 100 is deflected by the second scanning element 22, condensed by the condenser lens 31, and enters the light-receiving element group 33 via the optical filter 32.

As illustrated in FIG. 1, the illumination light 60 scans the object 100 in the Y-axis direction as a result of that the first scanning element 21 rotates about an axis parallel to the Z-axis. The reflected light 61 from the object 100 is reflected on the surface 222 of the second scanning element 22 according to the scanning angle in the Y-axis direction of the first scanning element 21, is guided to the light receiver 30, and is condensed on the light-receiving element group 33 according to the scanning angle even in the condenser lens 31. Regarding the Z-axis direction, the reflected light 61 is condensed on the light-receiving element group 33 without being affected by the deflection of the scanning angle of the second scanning element 22, as illustrated in FIG. 2. That is, the light-receiving element group 33 needs to dispose the light-receiving elements 331 according to the scanning angle of the first scanning element 21 in the Y-axis direction, while in the Z-axis direction, the light-receiving element group 33 is not affected by the scanning angle of the second scanning element 22. As a result, the size of the light-receiving element group 33 is enough to correspond to the size of the reflected light 61 condensed by the condenser lens 31, and the size of the light-receiving element group 33 and the number of light-receiving elements can be significantly reduced. The light-receiving element that receives the reflected light 61 changes depending on the scanning angle of the first scanning element 21. Accordingly, the control unit 40 performs control to drive the light-receiving element 331 that is receiving the reflected light 61 among the plurality of light-receiving elements 331 (supplies power to the light-receiving element 331), and not to drive the light-receiving element 331 that is not receiving the reflected light 61. Thereby, reception of unnecessary light other than signal light that causes noise can be suppressed. In addition, a ratio of signal to noise (S/N ratio) can be increased, and a long-distance measurement can be performed. The reduced number of light-receiving elements can suppress power consumption, simplify the electric circuit, and reduce the substrate size.

The control unit 40 is, for example, a processing apparatus (processor) such as a Central Processing Unit (CPU), or a calculation apparatus (computer) including the same, and controls the light source 11, the first scanning element 21, the second scanning element 22, the light-receiving element group 33, and the like. The control unit 40 drives each of the light source 11, the first scanning element 21, and the second scanning element 22 at a predetermined driving voltage and a predetermined driving frequency. The control unit 40 can, for example, control the light source 11 to convert the illumination light 60 into pulsed light, or perform intensity modulation for the illumination light 60 to generate signal light.

The control unit 40 can acquire distance information about the object 100 based on the emission time of the illumination light 60 from the light source 11 (light emission time) to the reception time of the reflected light 61 by the light-receiving element 331 from the object 100 (light reception time). At this time, the control unit 40 may acquire the signal from the light-receiving element group 33 at a specific frequency. The distance information may be acquired based on the phase of the reflected light 61 from the object 100 instead of the reception time of the reflected light 61 from the object 100. More specifically, the control unit 40 finds the difference (phase difference) between the phase of the signal from the light source 11 and the phase of the signal output from the light-receiving element group 33, and multiplying the phase difference by the light speed, and acquires the distance information about the object 100.

The light source 11 may be disposed so that the x-axis in FIG. 3 and the Z-axis in FIG. 4 match, and the y-axis in FIG. 3 and the Y-axis in FIG. 4 match. The divergent angle of illumination light 60 when emitted from light source 11 is different in two orthogonal directions. Due to the light source 11 disposed as described above, the direction in which the illumination light 60 has a large divergent angle becomes the Y-axis direction (direction corresponding to the first direction) when it enters the light-receiving element group 33, and the direction in which the divergent angle is small becomes the Z-axis direction. As a result, the size of the reflected light 61 condensed by the condenser lens 31 is shorter in the Y-axis direction and longer in the Z-axis direction due to the conjugate relationship with the light source 11, as illustrated in FIG. 4. Therefore, the number of light-receiving elements in the Z-axis direction of the light-receiving element group 33 may correspond to the size of the illumination light 60. Thereby, the number of light-receiving elements in the light-receiving element group 33 can be significantly reduced.

The following inequality (1) may be satisfied:

$$P \geq 2 \times f \times \tan(\theta/2) \tag{1}$$

where f is a focal length of the condenser lens 31, P is a pixel pitch (distance between the centers of the light-receiving elements 331 in the Y-axis direction) in the Y-axis direction (direction corresponding to the first direction) of the light-receiving element group 33, and 0 is a divergent angle of the illumination light 60 in the Y-axis direction (direction corresponding to the first direction) in a case where the object 100 is irradiated.

By satisfying inequality (1), the reflected light 61 condensed in the Y-axis direction on the light-receiving element group 33 can enter one light-receiving element 331, and improve the resolution.

The width of the area of the object 100 that is irradiated with the illumination light 60 is different in two orthogonal directions. The direction of the narrow width of the area may be a direction deflected by the first scanning element 21 (the Y-axis direction in this example), that is, the scanning range of the first scanning element 21 may be narrower than that of the second scanning element 22. This configuration can reduce the number of light-receiving elements in the light-receiving element group 33.

The rotation axis of the second scanning element 22 may be located outside the illumination optical path from the first scanning element 21 to the second scanning element 22. In this example, the rotation axis of the second scanning element 22 is parallel to the Y-axis, and the illumination optical path from the first scanning element 21 to the second scanning element 22 is deflected by the moving first scanning element 21 that swings about an axis parallel to the Z-axis. Therefore, the rotation axis of the second scanning element 22 is located outside the illumination optical path from the first scanning element 21 to the second scanning element 22. Thereby, the size of the surface which the reflected light 61 of the second scanning element 22 enters can be reduced.

The second scanning element 22 may be a polygon mirror having a plurality of reflective surfaces. This configuration allows scanning to be performed a plurality of times in one rotation, and thereby can improve the frame rate. The illumination light 60 and the reflected light 61 may be deflected by different surfaces of the polygon mirror. Thereby, the area per surface of the polygon mirror can be reduced, and the first scanning element 21 and the second scanning element 22 can be smaller.

The reflected light 61 from the object 100 may be deflected in an area through which the illumination light 60 of the second scanning element 22 corresponding to the reflected light 61 does not pass (an area different from the area where the illumination light 60 is deflected). Thereby, even the coaxial LiDAR can suppress the loss of light amount that might occur at an overlap portion between the illumination optical path and the light-receiving optical path.

The second scanning element 22 may be placed at the entrance pupil of the condenser lens 31. Thereby, the scanning surface of the second scanning element 22 can be smaller, the load on the driving unit for the second scanning element 22 can be reduced, and the optical apparatus 1 can be made smaller.

As explained above, the configuration of this example can realize highly accurate long-distance measurement.

Example 2

This example will discuss only the configurations that are different from Example 1, and will omit a description of the same configurations.

Figure 5:
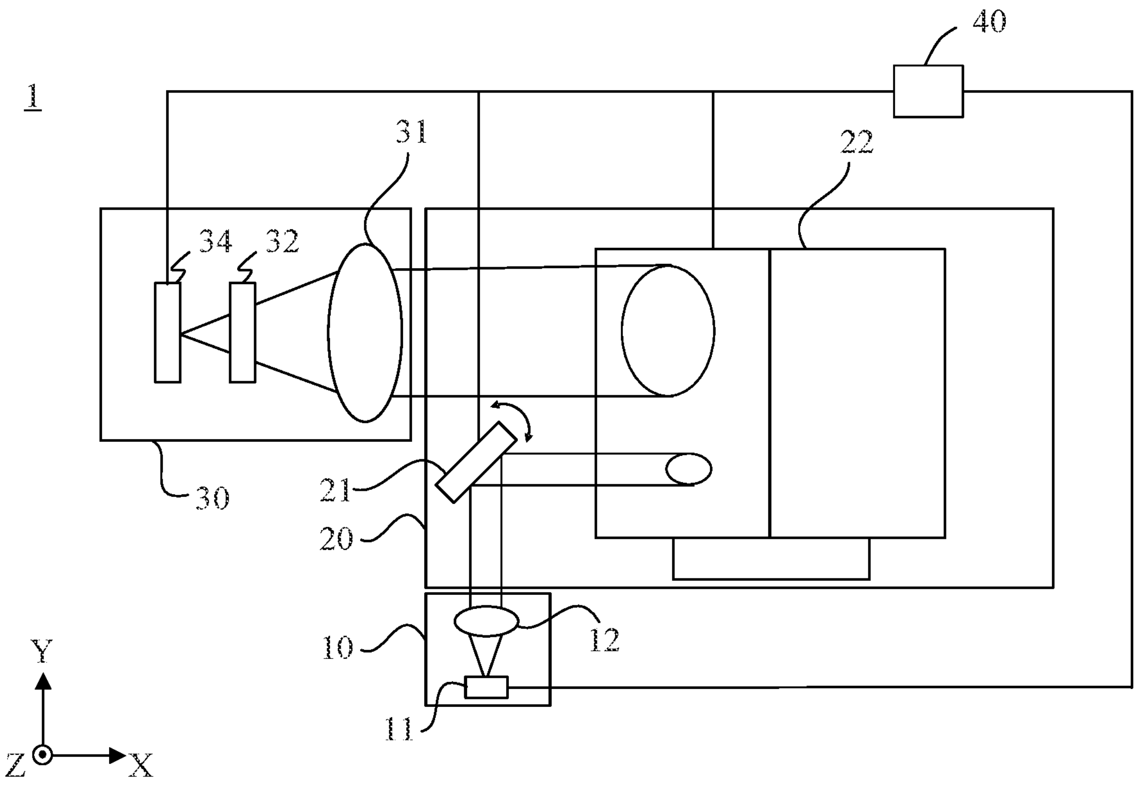
FIG. 5 is a schematic diagram of principal components in an optical apparatus according to Example 2.
Figure 6:
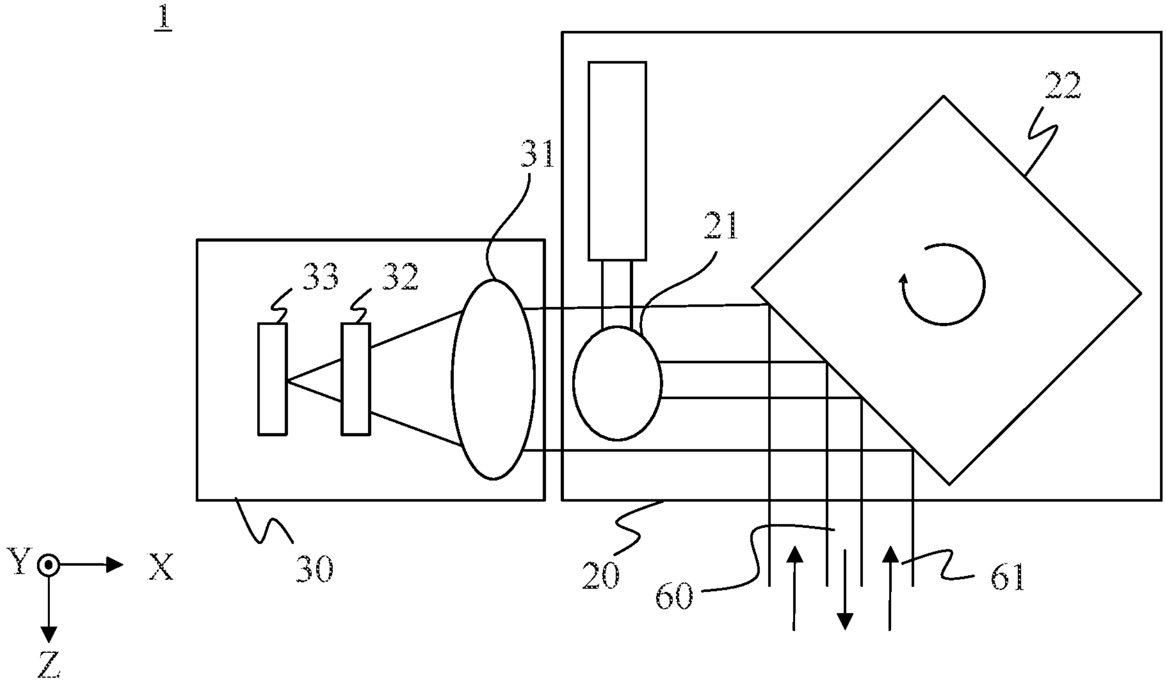
FIG. 6 is a top view of the optical apparatus according to Example 2.

FIG. 5 is a schematic diagram of principal components in the optical apparatus 1 according to this example viewed from the front. FIG. 6 is a top view (viewed from the +Y-axis direction) of the optical apparatus 1. FIG. 6 illustrates the optical path (illumination optical path) for the illumination light 60 from the light source unit 10 to the object, and the optical path (light receiving optical path) for the reflected light 61 from the object to the light receiver 30.

In this example, the light source 11 uses a VCSEL or a fiber laser instead of a semiconductor laser. Therefore, the section of the illumination light 60 is not elliptical but circular.

The light receiver 30 is disposed on the +Y-axis side of the light source unit 10. The illumination light 60 from the light source unit 10 is deflected by the first scanning element 21 and then deflected by the second scanning element 22 to illuminate the object. The reflected light 61 from the object is reflected by the surface of the second scanning element 22 that was used for the illumination, and is guided to the light receiver 30. Thereby, the size of the optical apparatus 1 in the lateral direction (X-axis direction) can be reduced. The second scanning element 22 is larger in the Y-axis direction than that of Example 1, but its radius of rotation is smaller. Therefore, the load on the driving unit for the second scanning element 22 can be reduced.

Figure 7:
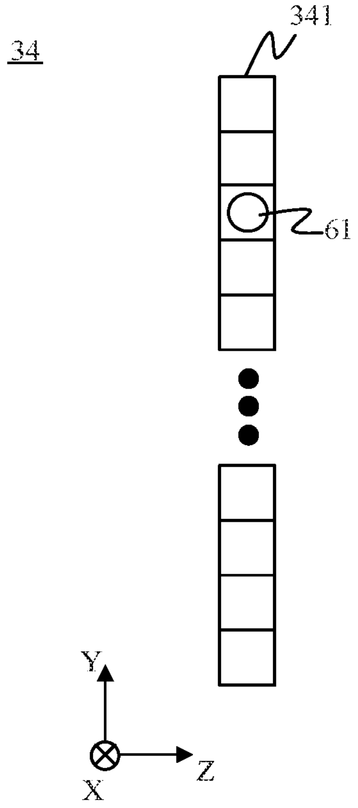
FIG. 7 is a schematic diagram of principal components in a light-receiving element group according to Example 2.

FIG. 7 is a schematic diagram of principal components in the light-receiving element group 34 included in the light receiver 30, and illustrates the configuration of the light-receiving element group 34 and the reflected light 61 that enters the light-receiving element group 34. As described above, in this example, the divergent angle of the light source 11 is isotropic, and the shape of the reflected light condensed by the condenser lens 31 is circular. Condensing the reflected light 61 on one light-receiving element 341 of the light-receiving element group 34 can reduce the number of light-receiving elements in the Y-axis direction of the light-receiving element group 34 to one. The reflected light 61 reflected by the object after being deflected for each scanning angle of the first scanning element 21 is condensed along the Y-axis direction of the light-receiving element group 34 according to the scanning angle. That is, the reflected light 61 can enter the single light-receiving element 341 in the Z-axis direction regardless of the scanning angle, and resolution can be improved.

Example 3

This example will describe only the configurations that are different from Example 1, and will omit a description of the same configurations.

Figure 8:
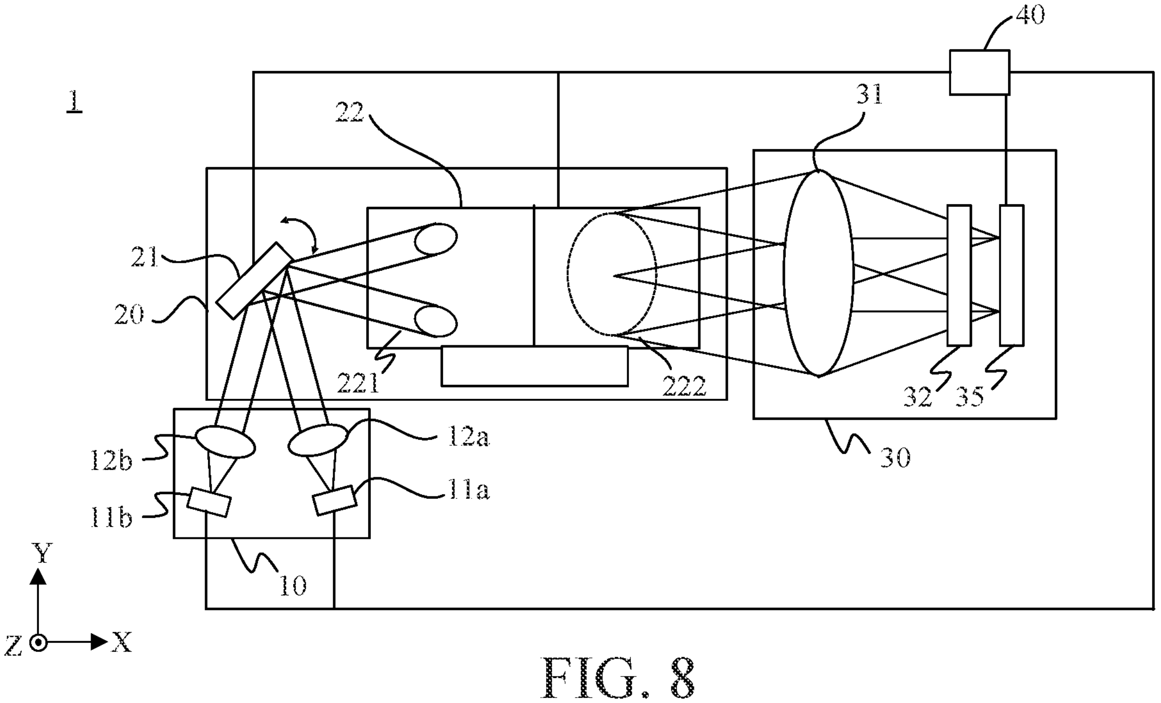
FIG. 8 is a schematic diagram of principal components in an optical apparatus according to Example 3.

FIG. 8 is a schematic diagram (schematic diagram) of principal components in the optical apparatus 1 according to this example viewed from the front. In this example, the light source unit 10 includes a light source (first light source) 11*a*, a light source (second light source) 11*b*, and collimator lenses 12*a* and 12*b*. The light sources 11*a* and 11*b* and collimator lenses 12*a*, 12*b* are disposed on the XY plane. By including a plurality of light sources, the light source unit 10 generates a plurality of illumination optical paths. The illumination light emitted from the light source 11*a* (first illumination light) and the illumination light emitted from the light source 11*b* (second illumination light) are collimated by collimator lenses 12*a* and 12*b*, respectively. Thereafter, the two illumination lights enter the first scanning element 21 and are reflected toward the second scanning element 22 at mutually different scanning angles in the Y-axis direction. Each illumination light is then deflected in the X-axis direction by the second scanning element 22 and irradiated onto the object. Each reflected light from the object is reflected by a surface different from the surface that was used to deflect the illumination light of the second scanning element 22, guided to the light receiver 30, and condensed by the condenser lens 31.

Figure 9:
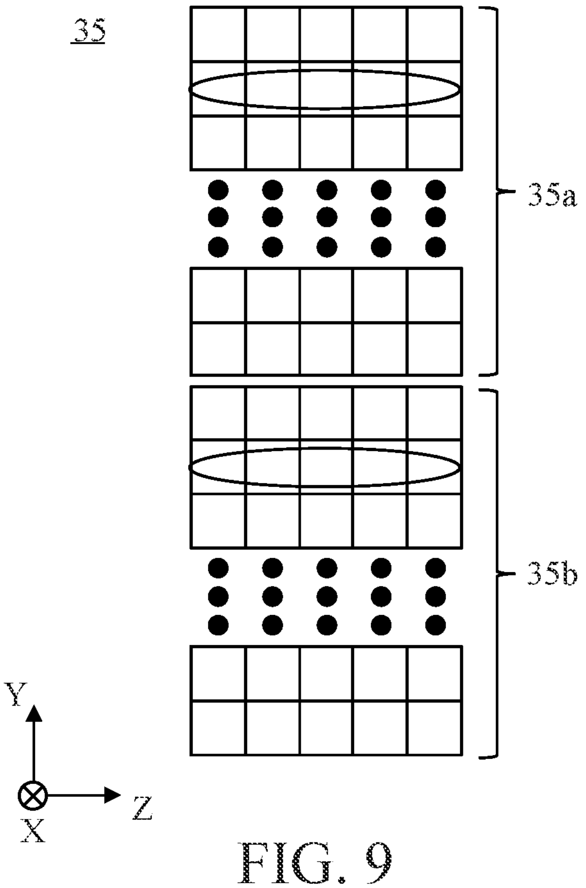
FIG. 9 is a schematic diagram of principal components in a light-receiving element group according to Example 3.

FIG. 9 is a schematic diagram of principal components in the light-receiving element group 35 included in the light receiver 30. The light-receiving element group 35 includes light-receiving elements corresponding to a plurality of illumination optical paths. More specifically, the light-receiving element group 35 includes a light-receiving element group 35*a* including a plurality of first light-receiving elements and a light-receiving element group 35*b* including a plurality of second light-receiving elements. The light-receiving element groups 35*a* and 35*b* are arranged to receive reflected light corresponding to the first illumination light (first reflected light) and reflected light corresponding to the second illumination light (second reflected light), respectively. Since the two light-receiving element groups 35*a* and 35*b* receive two different and separated reflected lights, the two light-receiving situations are independent, and the load on subsequent processing can be reduced.

As described above, by arranging a plurality of light sources and light-receiving elements, the optical apparatus 1 according to this example can have an angle of view wider than that of the optical apparatus 1 according to each of Examples 1 and 2.

In this example, the optical apparatus 1 has two light sources 11*a* and 11*b* and two light-receiving elements 351 and 352, but the number of light sources and light-receiving elements is not limited to two.

Example 4

This example will describe only the configurations that are different from Example 1, and will omit a description of the same configurations.

Figure 10:
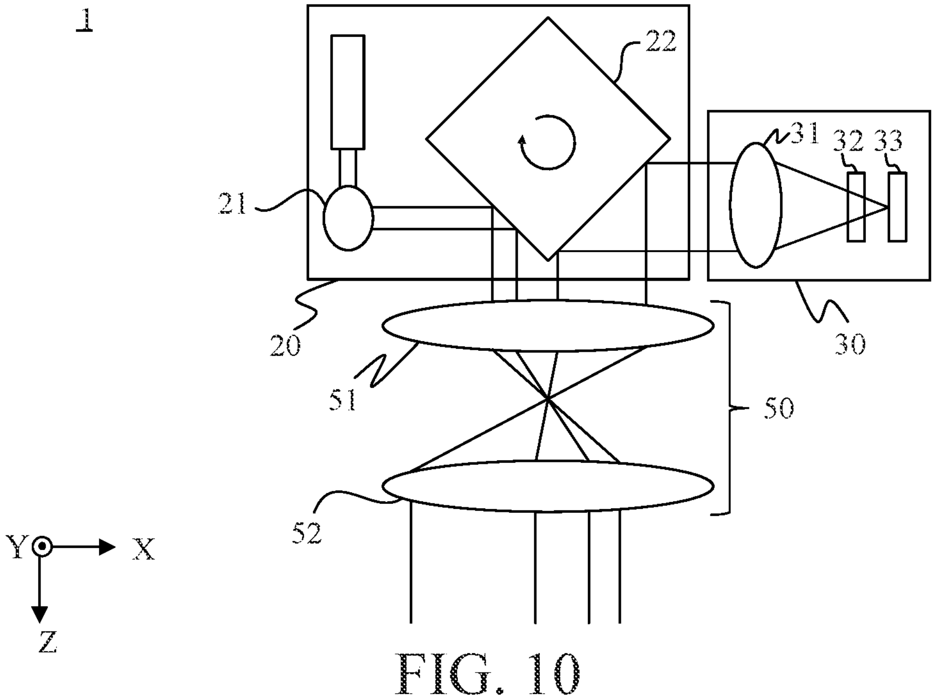
FIG. 10 is a schematic diagram of principal components in an optical apparatus according to Example 4.

FIG. 10 is a schematic diagram (schematic diagram) of principal components in the optical apparatus 1 according to this example in a section (XZ cross section) including the optical axis. In addition to the configuration according to Example 1, the optical apparatus 1 includes an unillustrated optical system 50 disposed between the deflector 20 and an object.

The optical system 50 is an optical system configured to change the light beam diameter of the deflector 20. In this example, the optical system 50 is an optical system (telescope) that enlarges the beam diameter of the illumination light from the deflector 20 and reduces the beam diameter of the reflected light from the object. The optical system 50 is an afocal system that includes a plurality of optical elements (lenses) having refractive power, and has no refractive power as a whole. More specifically, the optical system 50 includes, in order from the deflector 20 side to the object side, a first lens 51 having positive power and a second lens 52 having positive power. The number of lenses is not limited to this example, and the optical system 50 may include three or more lenses, as necessary. The optical system 50 may be an optical system that reduces the beam diameter of the illumination light from the deflector 20 and enlarges the beam diameter of the reflected light from the object.

The deflector 20 is placed at the entrance pupil of the optical system 50. The absolute value of the optical magnification (lateral magnification) β of the optical system 50 is larger than 1 (|β|>1). Thereby, a deflection angle of a principal ray of the illumination light emitted from the optical system 50 becomes smaller than a deflection angle of a principal ray of the illumination light that is deflected by the deflector 20 and enters the optical system 50, and the resolution for detecting the object can be improved.

The illumination light from the light source unit 10 is deflected by the deflector 20, enlarged by the optical system 50 according to the optical magnification β, and irradiated onto the object. The reflected light from the object is reduced by the optical system 50 according to the optical magnification 1/β, deflected by the deflector 20, and condensed by the condenser lens 31 to reach the light-receiving element group 33.

The optical system 50 disposed on the object side of the deflector 20 can enlarge the diameter of the illumination light by the optical system 50. This allows the diameter of the illumination light to be further enlarged and a divergent angle to be further reduced, and thus sufficient illuminance and resolution can be secured even when the object is located at a distant position. Enlarging the pupil diameter using the optical system 50 can capture more reflected light from the object, and improve the measured distance and the distance measurement accuracy.

On-Board System

Figure 11:
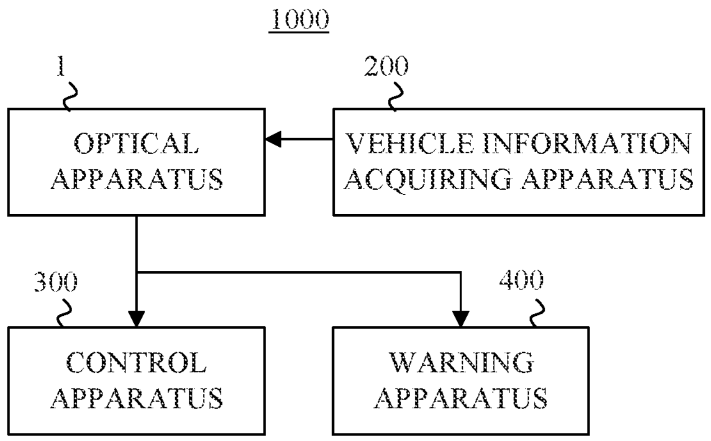
FIG. 11 is a block diagram of an on-board system (in-vehicle system) according to this embodiment.
Figure 12:
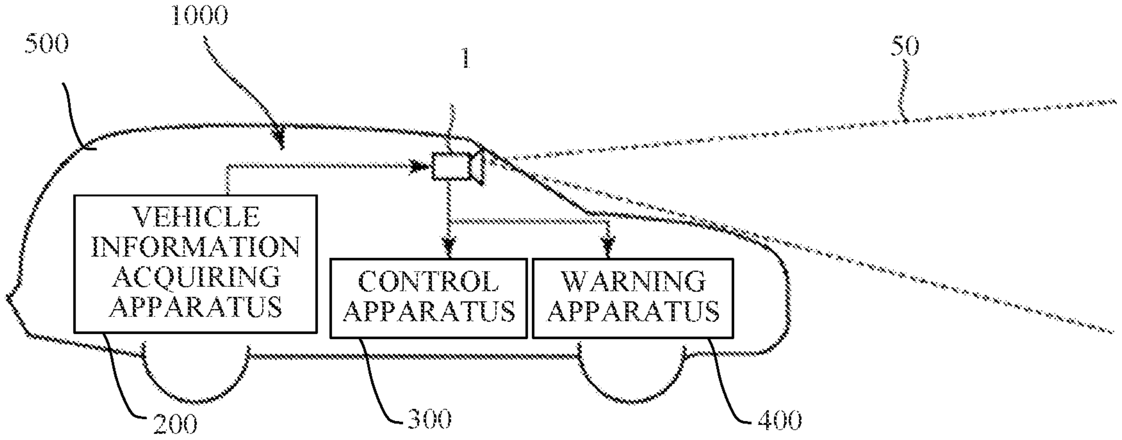
FIG. 12 is a schematic diagram of a vehicle (movable apparatus) according to this embodiment.

FIG. 11 is a configuration diagram of an optical apparatus 1 according to this example, and an on-board system (driving support apparatus) 1000 having the same. The on-board system 1000 is an apparatus held by a movable moving body (moving apparatus) such as an automobile (vehicle), and configured to support driving (steering) of the vehicle based on distance information on an object such as an obstacle or a pedestrian around the vehicle acquired by the optical apparatus 1. FIG. 12 is a schematic diagram of a vehicle 500 including the on-board system 1000. FIG. 12 illustrates a case where the distance measuring range (detecting range) of the optical apparatus 1 is set to the front of the vehicle 500, but the distance measuring range may be set to the rear or side of the vehicle 500.

As illustrated in FIG. 12, the on-board system 1000 includes the optical apparatus 1, a vehicle information acquiring apparatus 200, a control apparatus (ECU: electronic control unit) 300, and a warning apparatus (warning unit) 400. In the on-board system 1000, the control unit 40 included in the optical apparatus 1 has functions of a distance acquiring unit (acquiring unit) and a collision determining unit (determining unit). However, if necessary, the on-board system 1000 may include a distance acquiring unit and a collision determining unit separate from the control unit 40, or these components may be provided outside of the optical apparatus 1 (for example, inside the vehicle 500). Alternatively, the control apparatus 300 may be used as the control unit 40.

Figure 13:
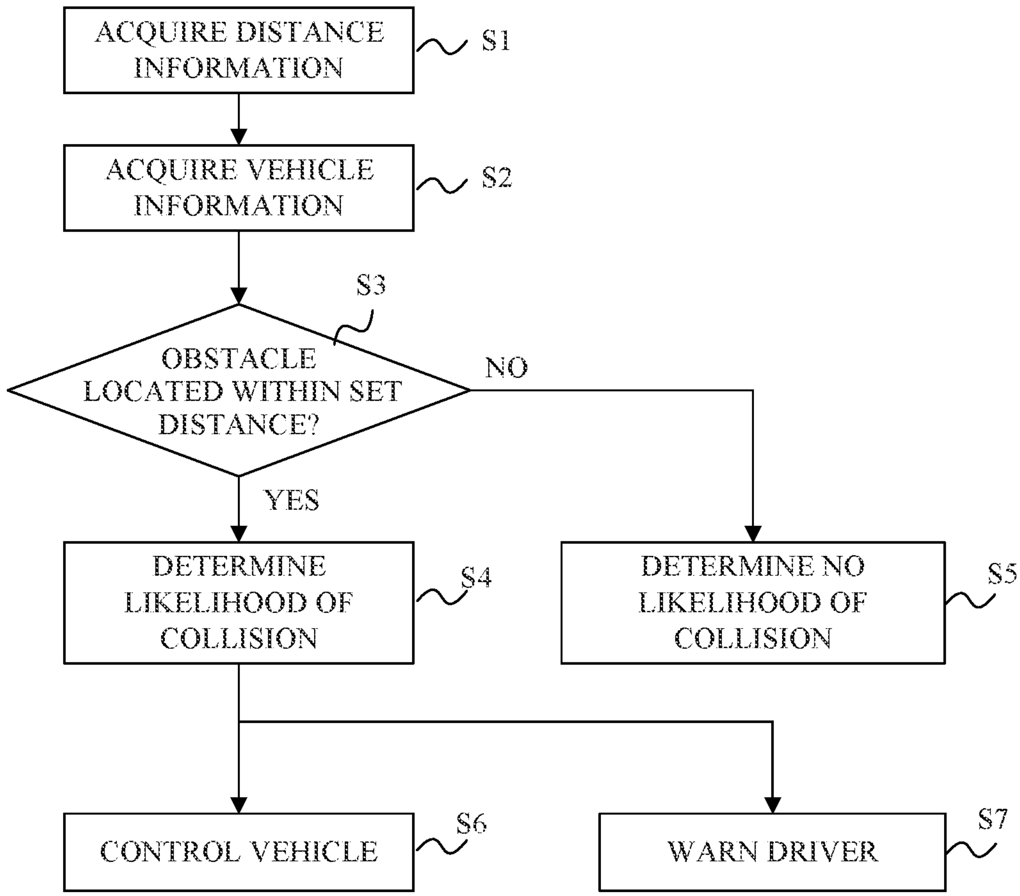
FIG. 13 is a flowchart illustrating an example of the operation of the on-board system according to this embodiment.

FIG. 13 is a flowchart illustrating an operation example of the on-board system 1000 according to this example. A description will now be given of the operation of the on-board system 1000 with reference to this flowchart.

First, in step S1, the light source unit 10 in the optical apparatus 1 illuminates an object around the vehicle, and the control unit 40 acquires the distance information on the object based on the signal output from the light receiver 30 by receiving the reflected light from the object. In step S2, the vehicle information acquiring apparatus 200 acquires vehicle information including the speed, yaw rate, steering angle of the vehicle, and the like. Next, in step S3, the control unit 40 determines whether the distance to the object is included within a preset distance range using the distance information acquired in step S1 and the vehicle information acquired in step S2.

This configuration can determine whether or not the object exists within the set distance range around the vehicle, and determine whether a collision is likely to occur between the vehicle and the object. Steps S1 and S2 may be performed in the reverse order of the above order or in parallel. The control unit 40 determines that the collision is likely in a case where the object exists within the set distance (step S4) and determines that the collision is unlikely in a case where the object does not exist within the set distance (step S5).

Next, in the case where the control unit 40 determines that the collision is likely, the control unit 40 notifies (transmits) the determination result to the control apparatus 300 and the warning apparatus 400. At this time, the control apparatus 300 controls the vehicle based on the determination result of the control unit 40 (step S6), and the warning apparatus 400 warns the user (driver) of the vehicle based on the determination result of the control unit 40 (step S7). The determination result may be notified to at least one of the control apparatus 300 and the warning apparatus 400.

The control apparatus 300 can control the vehicle by generating a control signal, for example, to apply the brakes, release the accelerator, turn the steering wheel, and generate braking force at each wheel to suppress the output of the engine or motor. The warning apparatus 400 warns the driver by, for example, emitting a warning sound, displaying warning information on the screen of a car navigation system, or applying vibration to the seat belt or steering wheel.

Thus, the on-board system 1000 according to this example can detect the object and measure the distance to the object by the above processing, and avoid the collision between the vehicle and the object. In particular, applying the optical apparatus according to each of the examples to the on-board system 1000 can realize high distance measuring accuracy, so that object detection and collision determination can be performed with high accuracy.

This example applies the on-board system 1000 to the driving support (collision damage mitigation), but the on-board system 1000 is not limited to this example and is applicable to cruise control (including adaptive cruise control) and automatic driving. The on-board system 1000 is applicable not only to a vehicle such as an automobile but also to a moving body such as a ship, an aircraft, or an industrial robot. It can be applied not only to moving objects but also to various devices that utilize object recognition such as intelligent transportation systems (ITS) and monitoring systems.

The on-board system 1000 and the moving apparatus may include a notification apparatus (notifying unit) for notifying the manufacturer of the on-board system, the seller (dealer) of the moving apparatus, or the like of any collisions between the moving apparatus and the obstacle. For example, the notification apparatus may use an apparatus that transmits information (collision information) on the collision between the moving apparatus and the obstacle to a preset external notification destination by e-mail or the like.

Thus, the configuration for automatically notifying the collision information through the notification apparatus can promote processing such as inspection and repair after the collision. The notification destination of the collision information may be an insurance company, a medical institution, the police, or another arbitrary destination set by the user. The notification apparatus may notify the notification destination of not only the collision information but also the failure information on each component and consumption information on consumables. The presence or absence of the collision may be detected based on the distance information acquired by the output from the above light receiver or by another detector (sensor).

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an optical apparatus that can provide distance measurement with high accuracy.

This application claims the benefit of Japanese Patent Application No. 2023-059445, filed on Mar. 31, 2023, which is hereby incorporated by reference herein in its entirety.

What is claimed is:

1. An optical apparatus comprising:

a deflector configured to scan an object by deflecting illumination light from a light source unit and to deflect reflected light from the object;

a light receiver configured to receive the reflected light from the deflector; and an optical system, wherein the deflector includes a first scanning element configured to scan the object in a first direction by deflecting the illumination light from the light source unit, and a second scanning element configured to scan the object in a second direction by deflecting the illumination light from the first scanning element, wherein the light receiver includes a plurality of light-receiving elements arranged along a direction parallel to the first direction on an optical path, wherein the optical system is configured to condense the reflected light onto the plurality of light-receiving elements, and wherein the following inequality is satisfied:

$$P \geq 2 \times f \times \tan(\theta/2)$$

where f is a focal length of the optical system, P is a pixel pitch of the plurality of light-receiving elements in the direction corresponding to the first direction, and θ is a divergent angle in the direction corresponding to the first direction of the illumination light irradiated onto the object.

* * * * *